United States Patent [19]

Hasegawa

[11] Patent Number: 4,730,211

[45] Date of Patent: Mar. 8, 1988

[54] PROJECTION-TYPE COLOR TELEVISION RECEIVER WHEREIN THE CENTER LINES OF RIGHT AND LEFT PROJECTION LENSES INTERSECT A DISPLAY SCREEN AT POINTS WHICH ARE OFFSET FROM A POINT AT WHICH THE CENTER LINE OF A CENTER PROJECTION LENS INTERSECTS THE DISPLAY SCREEN

[75] Inventor: Shinichi Hasegawa, Tokyo, Japan

[73] Assignee: Pioneer Electronic Corporation, Tokyo, Japan

[21] Appl. No.: 892,855

[22] Filed: Aug. 4, 1986

[30] Foreign Application Priority Data

Aug. 6, 1985 [JP] Japan .................. 60-172654

[51] Int. Cl.$^4$ .................. H04N 9/31; H04N 9/16
[52] U.S. Cl. .................. 358/60; 358/64
[58] Field of Search .................. 358/60, 64

[56] References Cited

U.S. PATENT DOCUMENTS

| | | | |
|---|---|---|---|
| 4,087,835 | 5/1978 | Nishimura et al. | 358/60 |
| 4,194,216 | 3/1980 | Ohmori | 358/60 |
| 4,219,843 | 8/1980 | Takahashi | 358/60 |
| 4,274,110 | 6/1981 | Lehnert | 358/60 |
| 4,376,949 | 3/1983 | Rowe | 358/60 |
| 4,621,281 | 11/1986 | Colineau | 358/60 |

FOREIGN PATENT DOCUMENTS

| | | | |
|---|---|---|---|
| 2034 | 1/1978 | Japan | 358/60 |
| 5488 | 1/1982 | Japan | 358/60 |
| 31681 | 2/1983 | Japan | 358/60 |
| 10086 | 1/1984 | Japan | 358/60 |

Primary Examiner—James J. Groody
Assistant Examiner—Randall S. Svihla
Attorney, Agent, or Firm—Finnegan, Henderson, Farabow, Garrett and Dunner

[57] ABSTRACT

A projection-type television receiver comprising right, left and center projection tubes each having a face, the images on the faces of the right and left tubes being formed in registry with the center of each corresponding face for minimizing keystone distortion and maximizing luminance in the receiver, and a transmissive screen for displaying a composite picture of images from the tubes. A lens corresponding to each tube focuses the images from the tube to form a coincident image, and mirrors reflect the coincident image onto the screen for viewing. A particular arrangement of the lenses is described for substantially uniform luminance on the screen and for a substantially symmetrical temperature distribution on the faces of the tubes. It is also preferred that each of the lenses corresponding to the left and right projection tubes have an associated center-line, and that the point of intersection of the center-line of each of the right and left lenses with the transmissive screen be offset by a fixed amount toward each lens from the point of intersection of the center line of the center lens with the transmissive screen. The angle of inclination $\alpha'$ between each of the right and left lenses and the face of its corresponding projection tube, and the angle of inclination $\alpha$ between the center-line of each of the right and left lenses and the transmissive screen preferably satisfy the equation:

$$1/m \cdot \tan\alpha = \tan\alpha'$$

where m is the magnification of each respective lens.

4 Claims, 7 Drawing Figures

PROJECTION-TYPE COLOR TELEVISION RECEIVER WHEREIN THE CENTER LINES OF RIGHT AND LEFT PROJECTION LENSES INTERSECT A DISPLAY SCREEN AT POINTS WHICH ARE OFFSET FROM A POINT AT WHICH THE CENTER LINE OF A CENTER PROJECTION LENS INTERSECTS THE DISPLAY SCREEN

BACKGROUND OF THE INVENTION

1. Field of The Invention

The present invention relates generally to a projection-type television receiver, and more particularly to a receiver, wherein the rays of light of the images formed on the three projection cathode-ray tubes for red, green and blue colors are concentrated through lenses and reflected by mirrors such that said images are projected in registry on a transmissive screen.

2. Description of the Background Art

A conventional type of projection television receiver is shown schematically in FIG. 3. A plan view of the optics used in this TV receiver is shown in FIG. 4, and the relationship between the screen of each of three projection tubes and the images formed thereon is shown in FIG. 5. The principles causing this particular relationship are illustrated in FIGS. 6 and 7. The respective Figures are explained hereinafter.

An array of the three projection tubes is indicated at 1. Positioned at the center is a green projection tube 1G, and a red projection tube 1R and a blue projection tube 1B are arranged on both sides in a row. A lens system is indicated at 2. The lens system includes lenses 2G, 2R and 2B disposed in front of the green projection tube 1G, red projection tube 1R and blue projection tube 1B, respectively. A series of mirrors are indicated by 3a, 3b and 3c. The rays of light of the images formed on the screens of the three projection tubes, 1G, 1R and 1B, are concentrated through respective lenses 2G, 2R and 2B, and reflected three times by mirrors 3a, 3b and 3c in such a manner that the rays are focused on a transmissive screen 5 to display a composite picture of the images from the three projection tubes, 1G, 1R and 1B.

The central projection tube 1G produces a symmetrical image on the transmissive screen 5, since the center line 2Gs of the associated lens 2G is in alignment with the center of the screen 5. Therefore, it suffices that the image 7G is displayed in registry with the center of the screen 6G of the tube 1G.

On the other hand, the right and left projection tubes, 1R and 1B, are disposed offset from the center of the transmissive screen 5. Thus, if the lenses 2R and 2B are disposed such that their respective center lines 2Rs and 2Bs are parallel to the center line 2Gs, the result will be as shown in FIG. 6. In other words, if the images 7R and 7B were displayed as indicated by the solid line in FIG. 6 in such a manner that they agreed with the centers of the screens 6R and 6B of the projection tubes 1R and 1B, the center lines 2Rs and 2Bs would become positioned away from the center of the transmissive screen 5. This would result in each of the images projected from tubes 1R and 1B onto tscreen 5 being deviated from the image projected from 1G, as shown by the solid line in FIG. 6.

In order to avoid this problem, images 7R and 7B formed on the screens 6R and 6B must be offset from their centers, as shown by the dashed line in FIG. 6, such that each of the images projected on the transmissive screen 5 is biased. In this case, the following relationships exist among the focal length f of the lens 2, the distance, a, between the projection tube 1 and the lens 2, the distance, b, between the screen 5 and the lens 2, and the magnification m:

$$1/a + 1/b = 1/f \text{ and } m = b/a.$$

Each of the images formed on the projection tubes 1R and 1B can be projected onto the transmissive screen 5 to form an image that is in registry with the image from the tube 1G by directing the center lines 2Rs and 2Bs, as shown in FIG. 5, toward the point of intersection between the center line 2Gs and the transmissive screen 5. If this is done, each of the lenses 2R and 2B will be inclined to form an angle $\theta$ with the transmissive screen 5 as shown in FIG. 7. In order to obtain focus on the front face of the screen 5, the screens 6R and 6B, of the projection tubes 1R and 1B must be inclined by the following angle with respect to the associated lenses, 2R and 2B: $1/m \tan \theta = \tan \theta'$. Therefore, if images 7R and 7S were formed on the screens 6R and 6B in alignment with their centers, as shown by the solid line in FIG. 7, the magnifications of the images would become different between the right and left sides. In order to avoid this problem, the images 7R and 7B must be formed in such a manner that they are offset from the centers of the screens 6R and 6B as shown by the dashed line in FIG. 7. At the same time, the difference in magnification must be corrected by processing the images 7R and 7B to a trapezoid form with a method known as "keystone distortion correction", that is commonly employed, as shown in FIG. 5.

This second method is chiefly used in the conventional type of projection television receivers. This method, however, has the disadvantage that an increased amount of power is consumed by a convergence circuit for correctng a keystone distortion, because the screen, 6R (6B), of the projection tube 1R (1B) and the transmissive screen 5 are inclined with respect to the lens 2R (2B) by large angles $\theta'$ and $\theta$, respectively. In addition, the images 7R and 7B formed on the screens 6R and 6B are biased from the respective centers, so that the temperature distributions in the screens 6R and 6B (or their faceplates) are not uniform with respect to their centers. This causes a reduction in the reliability of the faceplates, and also fails to make effective use of the fluorescent screen. In order to deal with the latter problem, the magnifying power of the lenses 2R and 2B must be increased. However, this causes the brightness of the transmissive screen 5 to be reduced, since the brightness is in inverse proportion to the square of the magnification (m). Furthermore, the lens 2R (2B) has different angles of view, $\beta 1$ and $\beta 2$, with respect to the center lines 2Rs (2Bs), and this makes the brightness of the image projected on the screen 5 different between the right and left sides, since the brightness on the screen 5 is related to $\cos^4 \beta$.

Accordingly, it is an object of the present invention to minimize the occurrence of keystone distortion and thereby reduce power consumption of the convergence circuit in a projection television receiver.

Another object of the invention is to uniformly distribute the temperature on the faceplate of each projection tube with respect to the center of the tube and thereby to improve tube reliability.

It is also an object of the invention to increase the luminance on the transmissive screen. In addition, it an object of the invention to make the image brightness substantially uniform on both sides (right and left) of the transmissive screen.

Additional objects and advantages will be obvious from the description, or may be learned by practice of the invention.

SUMMARY OF THE INVENTION

To achieve the foregoing objects and advantages, the projection-type television receiver of the present invention comprises projection tube means including right, left and center projection tubes each having a face, the tube means for forming images on the faces of said right and left tubes in registry with the center of each corresponding face; and a transmissive screen for displaying a composite picture of images from the projection tubes.

Preferably, the receiver includes lens means including an individual lens corresponding to each projection tube for focussing the images from the projection tubes to form a coincident image on the screen, and mirror means including an array of mirrors aligned for reflecting the coincident images from the lens means onto the screen.

It is also preferred that each of the lenses corresponding to the left and right projection tubes have an associated center line, and that the point of intersection of the center line of each of the right and left lenses with the transmissive screen be offset by a fixed amount toward each lens from the point of intersection of the center line of the center lens with the transmissive screen.

The angle of inclination $\alpha'$ between each of the right and left lenses and the face of its corresponding projection tube, and the angle of inclination $\alpha$ between the center line of each of the right and left lenses and the transmissive screen preferably satisfy the equation:

$$1/m \cdot \tan \alpha = \tan \alpha'$$

where m is the magnification of each respective lens.

The term "television receiver" is intended to mean a television receiver, a monitor or the like.

BRIEF DESCRIPTION OF THE DRAWINGS

The accompanying drawings, which constitute a part of the specification, illustrate one embodiment of the invention, and, together with the description, serve to describe the principles of the invention. Of the drawings.

DETAILED DESCRIPTION OF THE PREFERRED EMBODIMENT

Reference will now be made in detail to the present preferred embodiment of the invention, an example of which is illustrated in the accompanying drawings.

Figure 1:
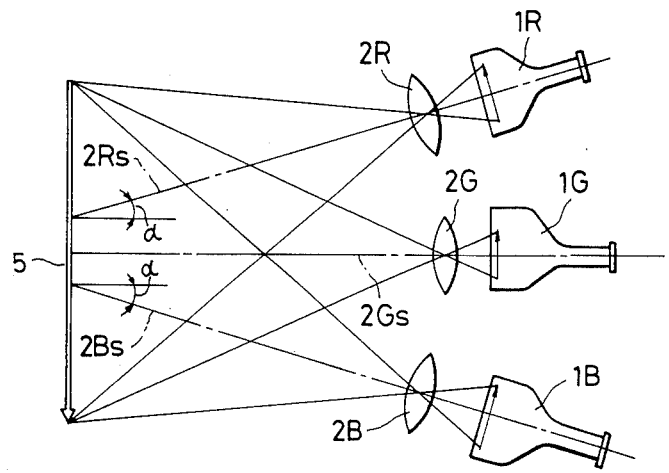
FIG. 1 is a plan view of the optics used in a projection-type television receiver according to one embodiment of the present invention.
Figure 2:
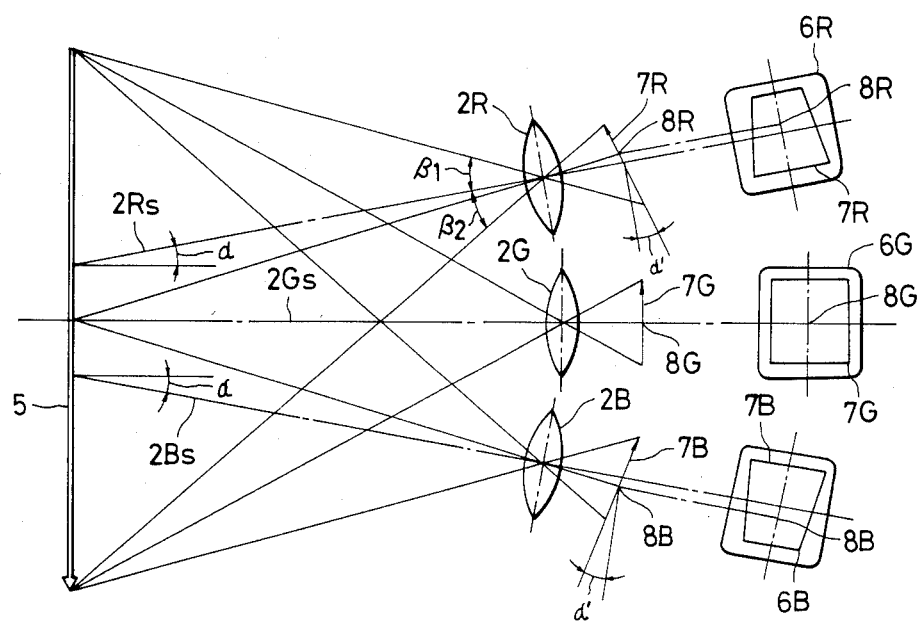
FIG. 2 illustrates the relationship between the transmissive screen, the screen of each of the three projection tubes, and the images formed on the screens.
Figure 3:
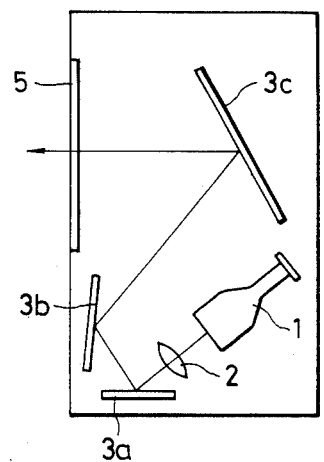
FIG. 3 is a side view of a conventional type of projection television receiver.
Figure 4:
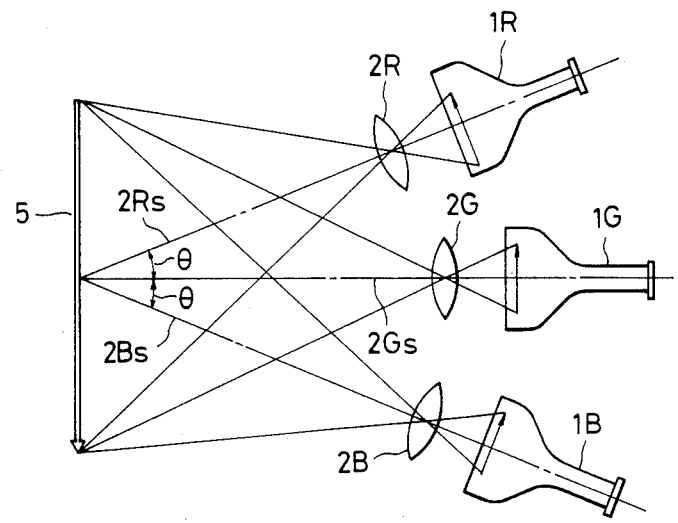
FIG. 4 is a plan view of the optics used in the system of FIG. 3.
Figure 5:
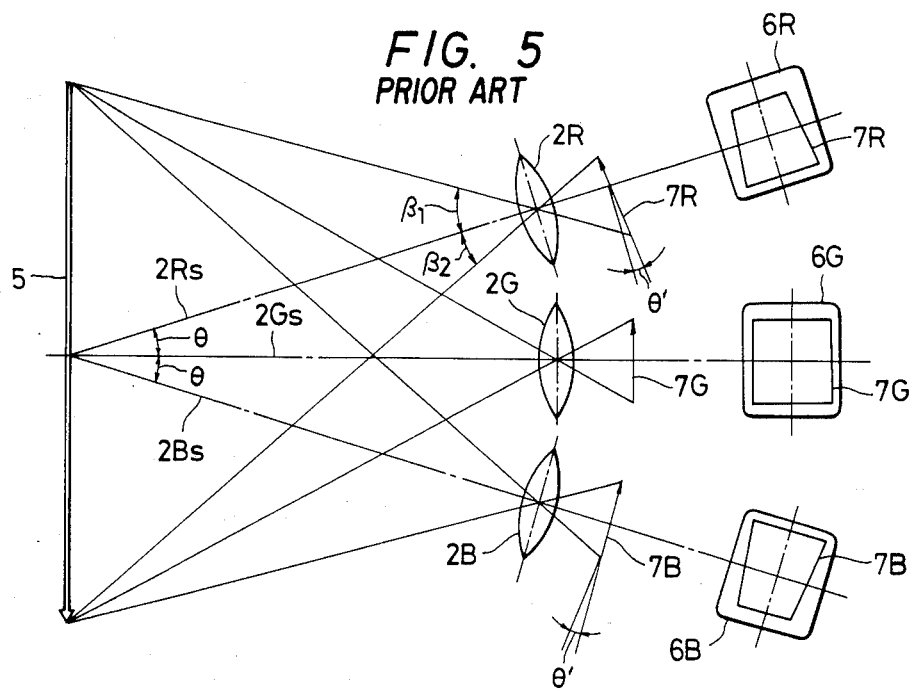
FIG. 5 illustrates the relationship between the transmissive screen, the screen of each of the three projection tubes, and the images formed on the screens in the system of FIG. 4.
Figure 6:
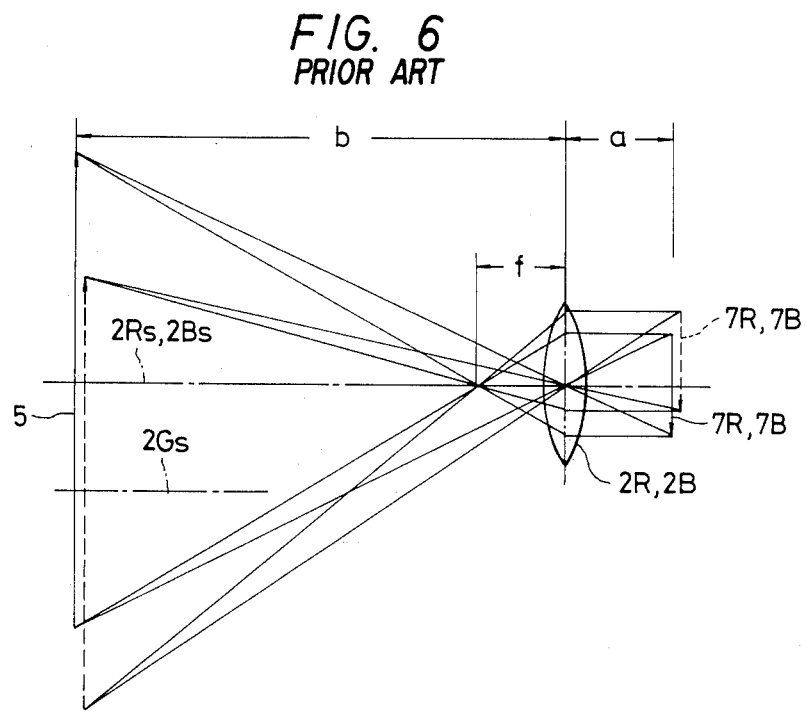
FIG. 6 and 7 illustrates two aspects of the relationship between the image on the screen of each of the right and left projection tubes and the image on the transmissive screen in the conventional system.
Figure 7:
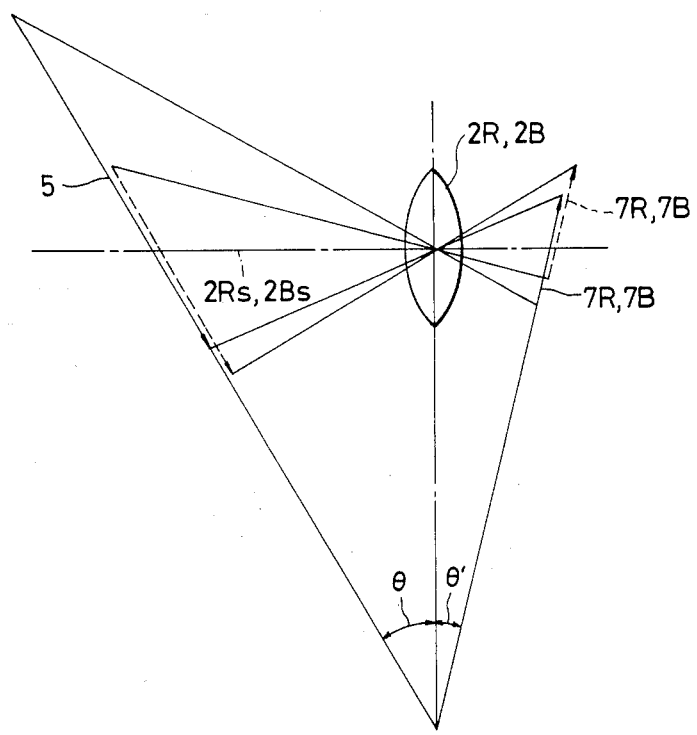

One embodiment of the present invention is hereunder described with reference to FIG. 1 which is a plan view of the associated optics and to FIG. 2 which shows relationship between the screen of each of the three projection tubes and the images formed thereon.

As in the conventional type of projection television receiver, an array of projection tubes 1 is composed of a green projection tube 1G, a red projection tube 1R and a blue projection tube 1B. The rays of light of the images formed by the three tubes are concentrated by lenses 2G, 2R and 2B and reflected thrice by three mirrors to produce focused images on the transmissive screen 5. The television receiver of the present invention differs from the conventional product in that the point at which the center line of 2Rs (2Bs) of the lens 2R (2B) intersects the transmissive screen 5 is offset toward the respective lens from the point of intersection between the center line 2Gs of the lens 2G and the transmissive screen 5. In the embodiment shown in FIG. 1, the amount of this offset is about 20 mm when the distance between the lens 2G and the screen 5 is 1260 mm.

In the embodiment shown, the angle of inclination, $\alpha'$, between the lens 2R (2B) and the screen or face 6R (6B) of the projection tube 1R (1B), and the angle of inclination, $\alpha$, between the center line 2Rs (2Bs) and the transmissive screen 5 satisfy the expression, $1/m \tan \alpha = \tan \alpha'$. In this case, the angles of view, $\beta_1$ and $\beta_2$, on the right and left sides of the lens 2R (2B) with respect to the center lines 2Rs (2Bs) are substantially the same, and the points on the screens or faces 6G, 6R and 6B which are projected onto the center of the transmissive screen 5 are 8G, 8R and 8B, respectively. As apparent from FIG. 2, the central green projection tube 1G attains alignment between the center line 2Gs and point 8G. However, with the red and blue tubes 1R and 1B, points 8R and 8B are offset from the center lines 2Rs and 2Bs.

Since the point 8R (8B) of the image 7R (7B) formed on the screen 6R (6B) of projection tube 1R (1B) is offset from the center of said screen, the unevenness which conventionally develops in the gap between the right (or left) edge of the image 7R (7B) and the adjacent side of the screen 6R (6B) is substantially eliminated. In other words, the image 7R (7B) can be formed in registry with the center of the screen 6R (6B). (In this case, the keystone distortion correction is performed so as to correct the difference in magnification between the right and left sides on the screen 6R (6B).

Therefore, by offsetting both center lines 2Rs and 2Bs with respect to the center line 2Gs, images 7R and 7B can be formed on the screens 6R and 6B in registry with their centers, and the view angles, $\beta 1$ and $\beta 2$, of each of the lenses 2R and 2B can be rendered substantially equal to each other.

As described in the foregoing pages, the projection type television receiver of the present invention is so constructed that the image formed on the screen of each of the right and left projection cathode-ray tubes is in registry with the center of that screen. This allows the images to produce a symmetrical temperature distribution on the screen and eliminates the development of thermal stress due to uneven thermal distribution, which is the cause of reduced reliability such as broken faceplates.

The angle (α) between the center line of the lens associated with each of the right and left projection tubes and the transmissive screen is decreased by the amount corresponding to the amount of offset of these center lines from the center line of the lens associated with the central projection tube. This allows for a corresponding decrease in the angle (α') formed by the screen of each of the right and left projection tubes and the associated lens. Also, in proportion as this angle α' is decreased, the difference in magnification between the right and left sides of each screen is also reduced.

This is effective in decreasing the difference in brightness on the transmissive screen between its right and left sides, and yields the advantages of a substantially uniform luminance on the transmissive screen and a minimum keystone distortion on the screen of each of the right and left projection tubes.

The second advantage leads to a smaller power consumption by the convergence circuit intended for correcting the keystone distortion and enables the optical axis of each lens to align with the center of the associated projection tube. As a result, any distortion in the lenses can be corrected accurately and adjustment for convergence can be readily achieved.

The system of the present invention maximizes the use of the fluorescent screen of each of the three projection tubes, thereby permitting the use of lenses having a lower magnification (m). Since the brightness of the transmissive screen is in inverse proportion to the square of magnification (m), this is effective in providing a higher luminance and contrast on the transmissive screen.

Various modifications and variations could be made in the invention without departing from the scope or spirit of the invention.

What is claimed is:

1. A projection-type color television receiver comprising:

projection tube means including right, left and center projection tubes each having a face, each of said projection tubes being capable of forming an image on its corresponding face, the image formed on the face of each of said right and left projection tubes being in registry with the center of its corresponding face;

a transmissive screen for receiving the images from said projection tubes and for displaying a composite picture of said images; and lens means, including right, left and center lenses corresponding to said right, left and center projection tubes, for focusing the images from said projection tubes onto said transmissive screen to form said composite picture;

wherein each of said right, left and center lenses has an associated center line, wherein the point of intersection of the center line of each of said right and left lenses with said transmissive screen is offset by a fixed amount toward the corresponding lens from the point of intersection of the center line of said center lens with said transmissive screen, and wherein the center line of each of said right and left lenses intersects said transmissive screen at an angle of inclination α other than 0°.

2. The receiver of claim 1, further comprising:

mirror means including an array of mirrors aligned for reflecting the images focused by said lens means to said transmissive screen.

3. The receiver of claim 2, wherein the angle of inclination α' between each of said right and left lenses and the face of the corresponding projection tube, and the angle of inclination α at which the center line of each of said right and left lenses intersects said transmissive screen satisfy the equation:

$$1/m \cdot \tan \alpha = \tan \alpha'$$

wherein m is the magnification of the corresponding lens.

4. The receiver of claim 1, wherein the angle of inclination α' between each of said right and left lenses and the face of the corresponding projection tube, and the angle of inclination α at which the center line of each of said right and left lenses intersects said transmissive screen satisfy the equation:

$$1/m \cdot \tan \alpha = \tan \alpha'$$

wherein m is the magnification of the corresponding lens.

* * * * *